(12) United States Patent
Tu et al.

(10) Patent No.: US 8,548,324 B2
(45) Date of Patent: Oct. 1, 2013

(54) METHOD AND APPARATUS FOR REGULATING SERVICE OF OPTICAL SYNCHRONOUS DIGITAL HIERARCHY NETWORK

(75) Inventors: Xiaoping Tu, Shenzhen (CN); Jun Lv, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 265 days.

(21) Appl. No.: 13/140,085

(22) PCT Filed: Sep. 11, 2009

(86) PCT No.: PCT/CN2009/073887
§ 371 (c)(1),
(2), (4) Date: Jun. 16, 2011

(87) PCT Pub. No.: WO2010/142093
PCT Pub. Date: Dec. 16, 2010

(65) Prior Publication Data
US 2011/0249974 A1      Oct. 13, 2011

(30) Foreign Application Priority Data
Jun. 11, 2009   (CN) .......................... 2009 1 0107934

(51) Int. Cl.
*H04J 14/00* (2006.01)
*H04Q 11/00* (2006.01)
(52) U.S. Cl.
CPC ............................... *H04Q 11/0005* (2013.01)
USPC .................... 398/47; 398/46; 398/52; 398/54
(58) Field of Classification Search
USPC ............................... 398/45–47, 51, 52, 54, 55
See application file for complete search history.

(56) References Cited

U.S. PATENT DOCUMENTS

| | | | | | |
|---|---|---|---|---|---|
| 5,457,556 | A | * | 10/1995 | Shiragaki ........................ | 398/50 |
| 6,512,612 | B1 | * | 1/2003 | Fatehi et al. .................... | 398/49 |
| 6,792,208 | B1 | * | 9/2004 | Mukherjee et al. ............. | 398/52 |
| 6,993,902 | B2 | | 2/2006 | Giberson et al. | |
| 7,209,658 | B2 | * | 4/2007 | Penninckx et al. ............. | 398/47 |

FOREIGN PATENT DOCUMENTS

| CN | 101179351 A | 5/2008 |
|---|---|---|
| CN | 101207931 A | 6/2008 |
| CN | 01299892 A | 11/2008 |
| EP | 0 637 414 B1 | 7/2000 |

* cited by examiner

*Primary Examiner* — Dalzid Singh
(74) *Attorney, Agent, or Firm* — Brooks Kushman P.C.

(57) ABSTRACT

The present invention discloses a method and an apparatus for adjusting a service of optical synchronous digital hierarchy network, and the method comprises: at first configuring the input time-slot space-division cross path to the time-division module after adjustment in space-division module and the time-division cross path of the time-division module after adjustment; and configuring the output time-slot space-division cross path from the time-division module after adjustment in space-division module; deleting the original cross path formed by the time-division module before adjustment. The apparatus comprises: a first configuration unit used to configure the input time-slot space-division cross path to the time-division module after adjustment in space-division module and the time-division cross path of the time-division module after adjustment; a second configuration unit configuring the output time-slot space-division cross path from the time-division module after adjustment in the space-division module; deleting the original cross path formed by the time-division module before adjustment.

6 Claims, 4 Drawing Sheets

METHOD AND APPARATUS FOR REGULATING SERVICE OF OPTICAL SYNCHRONOUS DIGITAL HIERARCHY NETWORK

CROSS-REFERENCE TO RELATED APPLICATIONS

This application is a U.S. national phase of PCT Application No. PCT/CN2009/073887 filed Sep. 11, 2009 which claims priority to Chinese Application No. 200910107934.4 filed Jun. 11, 2009, the disclosures of which are incorporated in their entirety by reference herein.

TECHNICAL FIELD

The present invention relates to optical transmission field, and specifically, to a method and an apparatus for adjusting a service of optical synchronous digital hierarchy network.

BACKGROUND OF THE RELATED ART

Optical transmission networks including transmission networks like WDM (Wavelength Division Multiplexing), SDH (Synchronous Digital Hierarchy) and SONET (Synchronous optical network) have been widely used in telecommunication field. In optical transmission network, optical cross connection is commonly needed, that is, any optical fiber signal is connected and reconnected with other optical fiber signals controllably in optical network nodes. For example, optical channel signals are reconnected automatically by digital cross-connection device with auto line distributing function.

In the digital cross-connection device, the cross-connection board is a single board in core status, which is mainly divided into space-division cross boards (space-division modules) and time-division cross boards (time-division modules). Recently, with the development of user service, the capacity of a single time-division module cannot meet the need of high-capacity time-division service of user due to factors like cost, and the application of multi-time-division modules comes into being, however, as the multi-time-division module cannot achieve the real full cross, using the traditional service configuration method when services are switched and adjusted in the time-division module will lead to instant service interruption time exceeding 50 ms greatly (automatic protection switching time requirement, requiring that the service of whole network needs to be recovered to be normal in 50 ms when the transmission path is faulted), thereby results in an interrupt of user service.

SUMMARY OF THE INVENTION

In view of this, the present invention provides a method and an apparatus for adjusting a service of optical synchronous digital hierarchy network, and may reduce the service instant-interrupt time to be less than 50 ms in the application of a multi-time-division module to meet the requirement of the service instant-interrupt time for adjusting a service.

To solve the above technical scheme, the present invention uses the following technical scheme:

A method for adjusting a service of optical synchronous digital hierarchy network, applied in adjustment of a cross path among a space-division module and at least two time-division modules, and the method comprising:

A. configuring an input time-slot space-division cross path to a time-division module after adjustment in a space-division module and a time-division cross path of the time-division module after adjustment; and B. configuring an output time-slot space-division cross path from the time-division module after adjustment in the space-division module; deleting an original cross path formed by a time-division module before adjustment.

In one embodiment of the above method for adjusting a service, the step of configuring said input time-slot space-division cross path and the step of configuring said time-division cross path are implemented simultaneously in said step A.

In one embodiment of the above method for adjusting a service, the step of configuring said input time-slot space-division cross path and the step of configuring said time-division cross path are implemented one after another in any order in said step A.

The present invention also discloses an apparatus for adjusting a service of optical synchronous digital hierarchy network, and the apparatus for adjusting a service is applied for adjusting a cross path among a space-division module and at least two time-division modules, and comprises:

a first configuration unit configured to configure an input time-slot space-division cross path to a time-division module after adjustment in a space-division module and a time-division cross path in a time-division module after adjustment; and a second configuring unit configured to configure an output time-slot space-division cross path from the time-division module after adjustment in the space-division module after the first configuration unit is configured; and to delete an original cross path formed by a time-division module before adjustment.

In one embodiment of the above apparatus for adjusting a service, said first configuration unit is also configured to configure said input time-slot space-division cross path and said time-division cross path simultaneously.

In one embodiment of the above apparatus for adjusting a service, said first configuring unit is also configured to configure said input time-slot space-division cross path and said time-division cross path one after another in any order.

The adjustment of the service path is implemented in two steps in the present invention, and at first the adjustment configuration of the input time-slot space-division cross path and the time-division cross path is completed, and then the output time-slot space-division cross path is configured and the original cross path is deleted, thereby finishing the adjustment of the service path. Since when the actual service path is switched, only the output time-slot space-division cross path is adjusted, the service instant-interrupt time may be reduced to be less than 50 ms to meet the requirement of the service instant-interrupt time for regulating a service.

PREFERRED EMBODIMENTS OF THE PRESENT INVENTION

The specific embodiment of the present invention is illustrated in detail in conjunction with accompany drawings.

Figure 1:
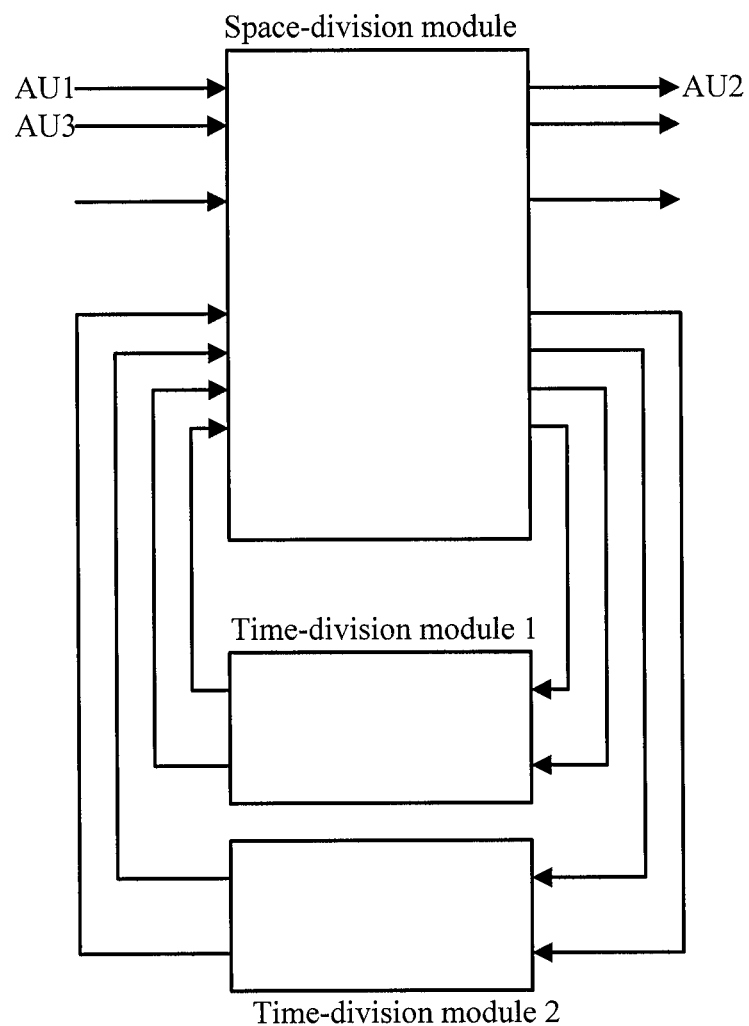
FIG. 1 is a structural diagram of a digital cross device in SDH network according to an example of the present invention.

FIG. 1 illustrates the architecture of an optical cross device for exemplary purpose. As illustrated in FIG. 1, it describes one space-division module and two time-division modules, i.e. time-division module 1 and time-division module 2. The space-division module comprises two input service points AU1 and AU3, and one output service point AU2.

Figure 2:
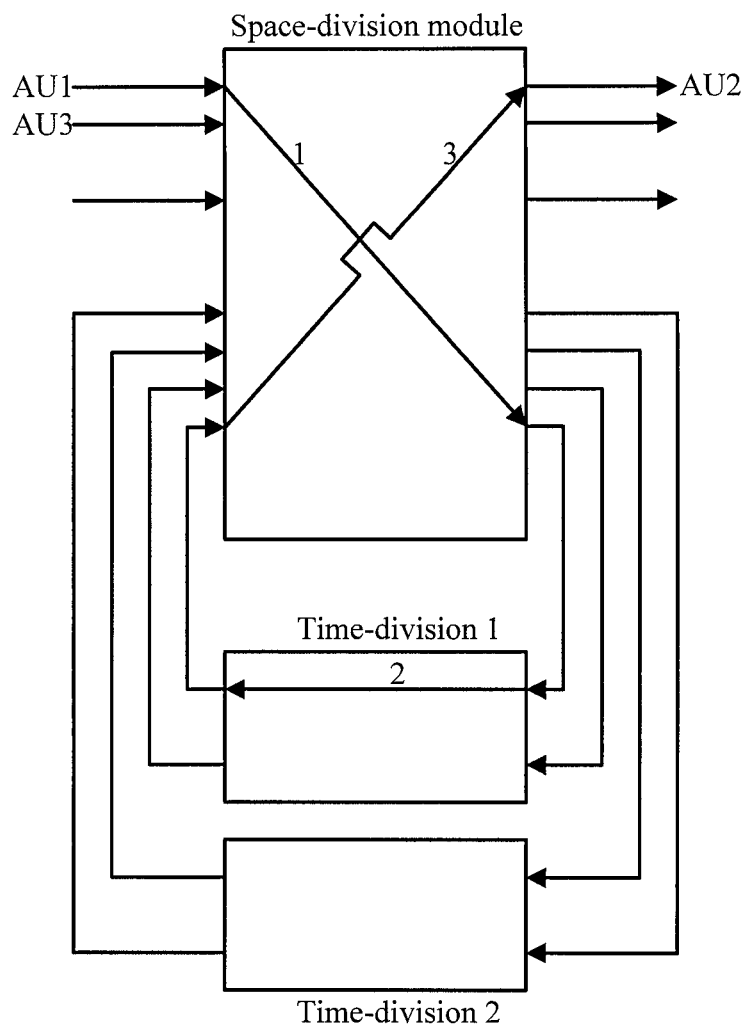
FIG. 2 is a schematic diagram of the cross path before adjusting a service according to an example of the present invention.

As shown in FIG. 2, the service is implemented by time-division module 1 before being adjusted. A service goes into input service point AU1, passes through cross path 1, cross path 2, cross path 3 and goes out from output service point AU2. Wherein, in time-division module 1, the left endpoint of cross path 2 is called service output point and the right endpoint of cross path 2 is called service input point according to the path orientation. For ease of description, the cross path of the space-division module is called space-division cross path in this article, and specifically, the space-division cross path where the service is sent from the input service point of the space-division module to the service input point of the time-division module is called input time-slot space-division cross path; the space-division cross path where the service is sent from the service output point of the time-division module to the output service point of the space-division module is called output time-slot space-division cross path; the cross path of the time-division module is called time-division cross path. It is apparent that cross path 1 is an input time-slot space-division cross path and cross path 2 is a time-division cross path and cross path 3 is an output time-slot space-division cross path.

Figure 3:
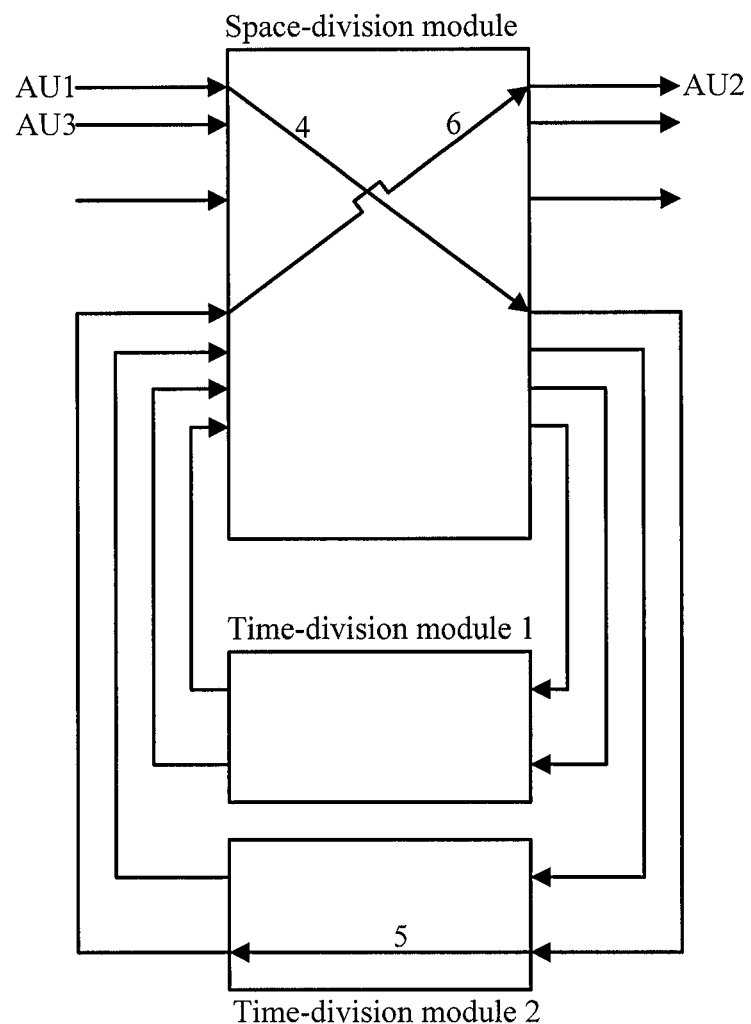
FIG. 3 is a schematic diagram of the cross path after adjusting a service according to an example of the present invention.

As shown in FIG. 3, the service is implemented by time-division module 2 after the service has been adjusted. A service goes into input service point AU1, passes through cross path 4, cross path 5, and cross path 6, and then goes out from output service point AU2. It is known according to the above description that cross path 4 is an input time-slot space-division cross path, cross path 5 is a time-division cross path, and cross path 6 is an output time-slot space-division cross path. As for the determination of cross path for adjusting the service, it is known to the person skilled in the art and is not explained herein. The focus of this description is: how to adjust the cross path when it is known that cross paths are cross path 1, cross path 2 and cross path 3 before the service is adjusted and cross paths are cross path 4, cross path 5 and cross path 6 after the service is adjusted.

The core idea of this invention is: as for the service in which other time-division modules are to be adjusted, it is sent in twice, thereby the instant-interrupt time in adjusting the service using the multi-time-division module is shortened. The adjusting process of this invention mainly comprises:

Step 1, configuring the adjusted input time-slot space-division cross path and the adjusted time-division cross path at first. Directing to the adjusted time-division module (time-division module 2), on the one hand, configuring the input time-slot space-division cross path in the space-division module where the service is sent to the adjusted time-division module; on the other hand, configuring the time-division cross path in the adjusted time-division module. The two configuration processes might be implemented simultaneously; or might be implemented one after another in any order.

Step 2, configuring the output time-slot space-division cross path after adjustment and deleting the cross path of the service before adjustment. Directing to the adjusted time-division module (time-division module 2), configuring the output time-slot space-division cross path in the space-division module where the service output point from the adjusted time-division module is connected to the output service point of the space-division module, and this configuration may be regarded as a replacement operation, that is, when the configuration is finished, the original cross path is replaced correspondingly, i.e. the cross path of the service before the adjustment is deleted.

Figure 4:
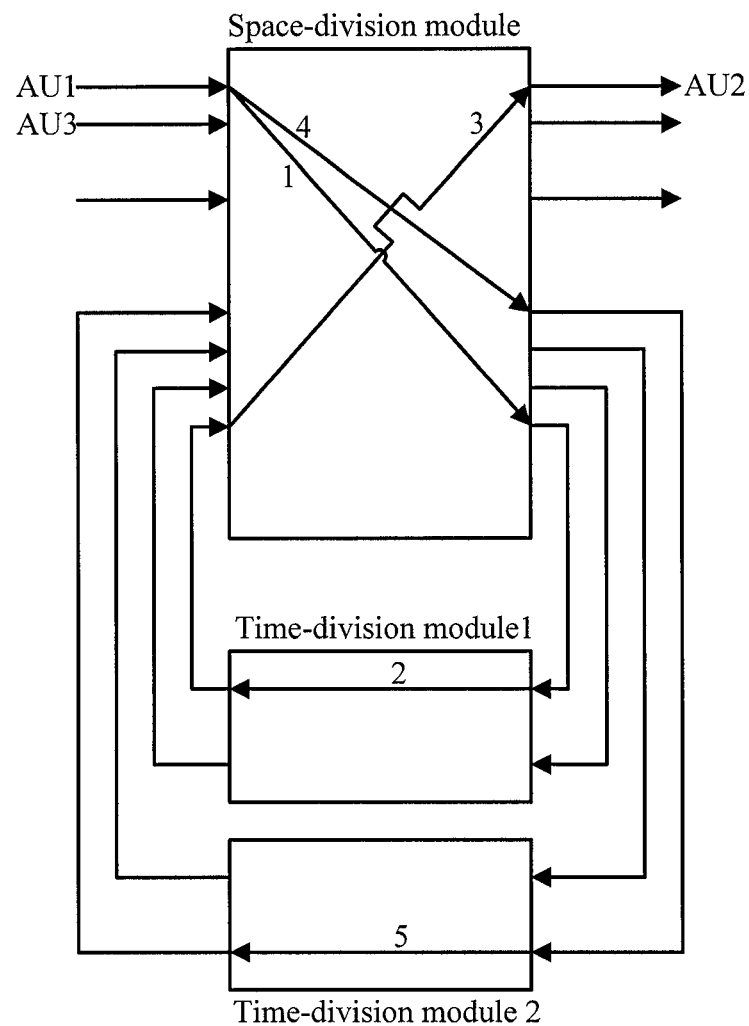
FIG. 4 is a schematic diagram of the cross path according to an example of the present invention.

As shown in FIG. 4, in the example of this invention, the service is adjusted from time-division module 1 to time-division module 2, and the main process comprises:

Step 1: pointing out the cross connection (cross connection 5) in the adjusted new time-division module, i.e. the time-division module 2, and the space-division cross connection in which the service is sent to time-division module 2 (cross-connection 4) at first, and sending them to the space-division module and the time-division module 2 to form the concurrence of the service, which has no effect on the service.

Step 2: sending a service configuration command to the space-division module and the time-division module 2 to finish service adjustment between the new and old time-division modules, the cross path after the adjustment is as shown in FIG. 3. The service configuration command is to instruct to:

1, delete the cross path of the service (cross paths 1, 2, 3) formed by the old time-division module (time-division module 1);

2, add the output time-slot space-division cross path (cross path 6) of the new time-division module (time-division module 2).

The present invention sends the service configuration to be adjusted in twice, so that service adjustment time of the multi-time-division module is only the switching time for one space-division cross path, thereby the instant-interrupt time for adjusting the service is less than 50 ms to meet the requirements of service instant-interrupt time for telecommunication users to adjust service, and to overcome the deficiency of service instant-interrupt time for adjusting the service exceeding 50 ms greatly when the space-division cross path and time-division cross path are adjusted simultaneously in one-time service sending in the traditional service configuration method. The method of the present invention doesn't need to increase other hardware and the implementation approach is simple and with good effect.

The above content further explains the present invention in detail in conjunction with specific preferred embodiment, however, it is merely an example for ease of understanding, and the specific implementation of the present invention should not be considered to be limited to explanations. For the ordinary person skilled in the technical art of this invention, all the possible equivalent modifications or replacements might be made in the prerequisite of not departing from the idea of this invention, and these modifications or replacements should all belong to the protection scope of the present invention.

INDUSTRIAL APPLICABILITY

The adjustment of the service path is performed in two steps in the present invention: the adjustment configuration of the input time-slot space-division cross path and the time-division cross path is completed firstly, and then the output time-slot space-division cross path is configured and the original cross path is deleted, thereby finishing the regulation of the service path. Since when the actual service path is switched, only the output time-slot space-division cross path is adjusted, the service instant-interrupt time may be reduced to be less than 50 ms to meet the requirement of the service instant-interrupt time for adjusting service.

What is claimed is:

1. A method for adjusting a service of optical synchronous digital hierarchy network, comprising:
   A. when a service is implemented by a space-division module and a first time-division module, a service adjusting apparatus configuring an input time-slot space-division cross path from an input service point of the space-division module to an input service point of a second time-division module and a time-division cross path inside the second time-division module for the service to form a concurrence of the service in the first time-division module and the second time-division module; and
   B. the service adjusting apparatus configuring an output time-slot space-division cross path from an output service point the second time-division module to an output service point of the space-division module for the service; and deleting an original cross path formed by the first time-division module so as to switch the service from the first time-division module to the second time-division module.

2. The method for adjusting a service of claim 1, wherein, the step of configuring said input time-slot space-division cross path and the step of configuring said time-division cross path are implemented simultaneously in said step A.

3. The method for adjusting a service of claim 1, wherein, the step of configuring said input time-slot space-division cross path and the step of configuring said time-division cross path are implemented one after another in any order in said step A.

4. An apparatus for adjusting a service of optical synchronous digital hierarchy network, comprising:
   a first configuration unit configured to when a service is implemented by a space-division module and a first time-division module, configure an input time-slot space-division cross path from an input service point of a space-division module to an input service point of a second time-division module and a time-division cross path inside the second time-division module for the service to form a concurrence of the service in the first time-division module and the second time-division module; and
   a second configuring unit configured to configure an output time-slot space-division cross path from an output service point the second time-division module to an output service point of the space-division module for the service; and deleting an original cross path formed by the first time-division module thereby switching the service from the first time-division module to the second time-division module;
   switching service from the first time-division module to the second time-division module.

5. The apparatus for adjusting a service of claim 4, wherein, said first configuration unit is also configured to configure said input time-slot space-division cross path and said time-division cross path simultaneously.

6. The apparatus for adjusting a service of claim 4, wherein, said first configuring unit is also configured to configure said input time-slot space-division cross path and said time-division cross path one after another in any order.

* * * * *